Oct. 21, 1941. H. KLAUCKE 2,259,937
ROLLER CHAIN SPROCKET WHEEL
Filed Feb. 5, 1940 4 Sheets-Sheet 1
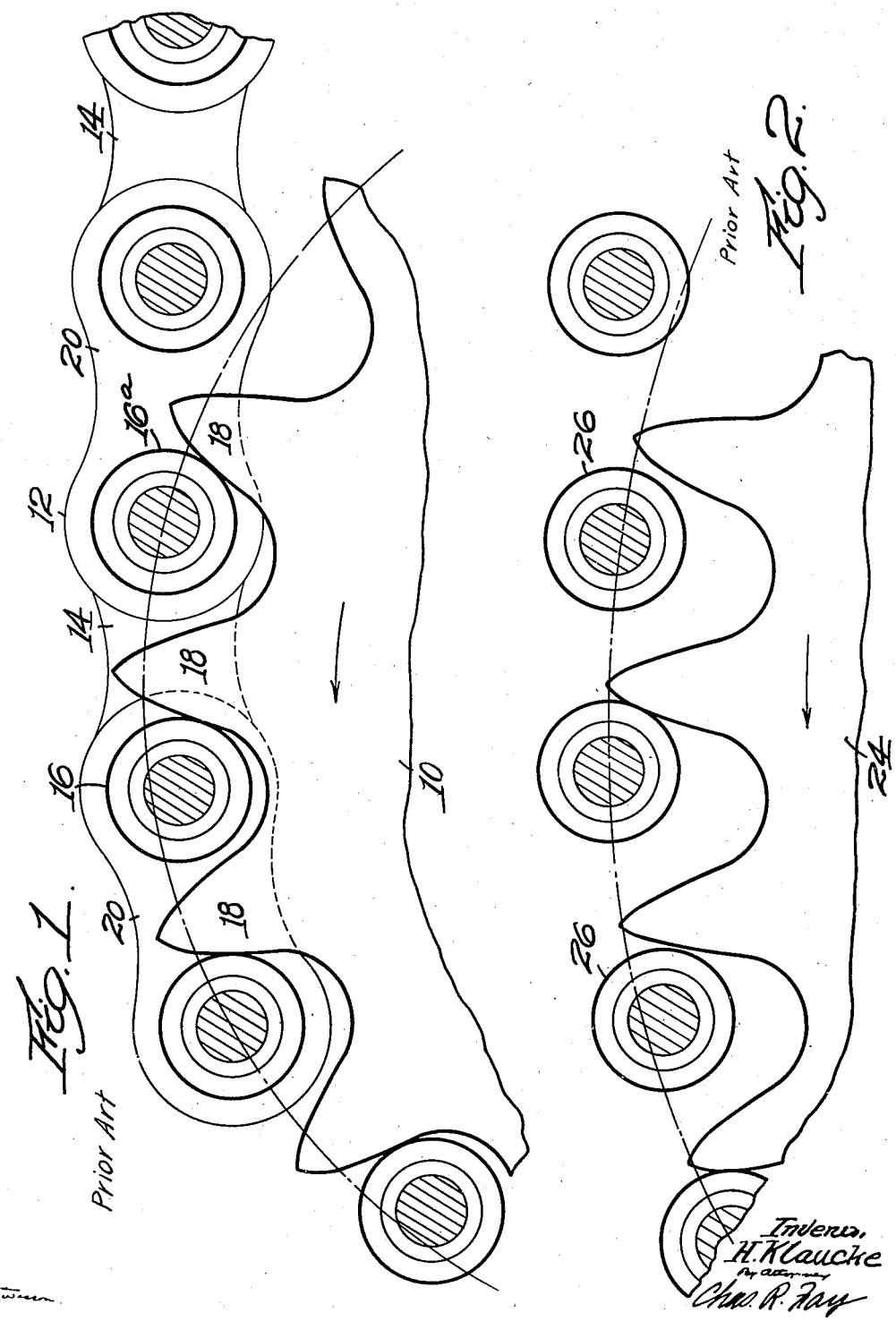

Oct. 21, 1941.  H. KLAUCKE  2,259,937
ROLLER CHAIN SPROCKET WHEEL
Filed Feb. 5, 1940  4 Sheets-Sheet 2
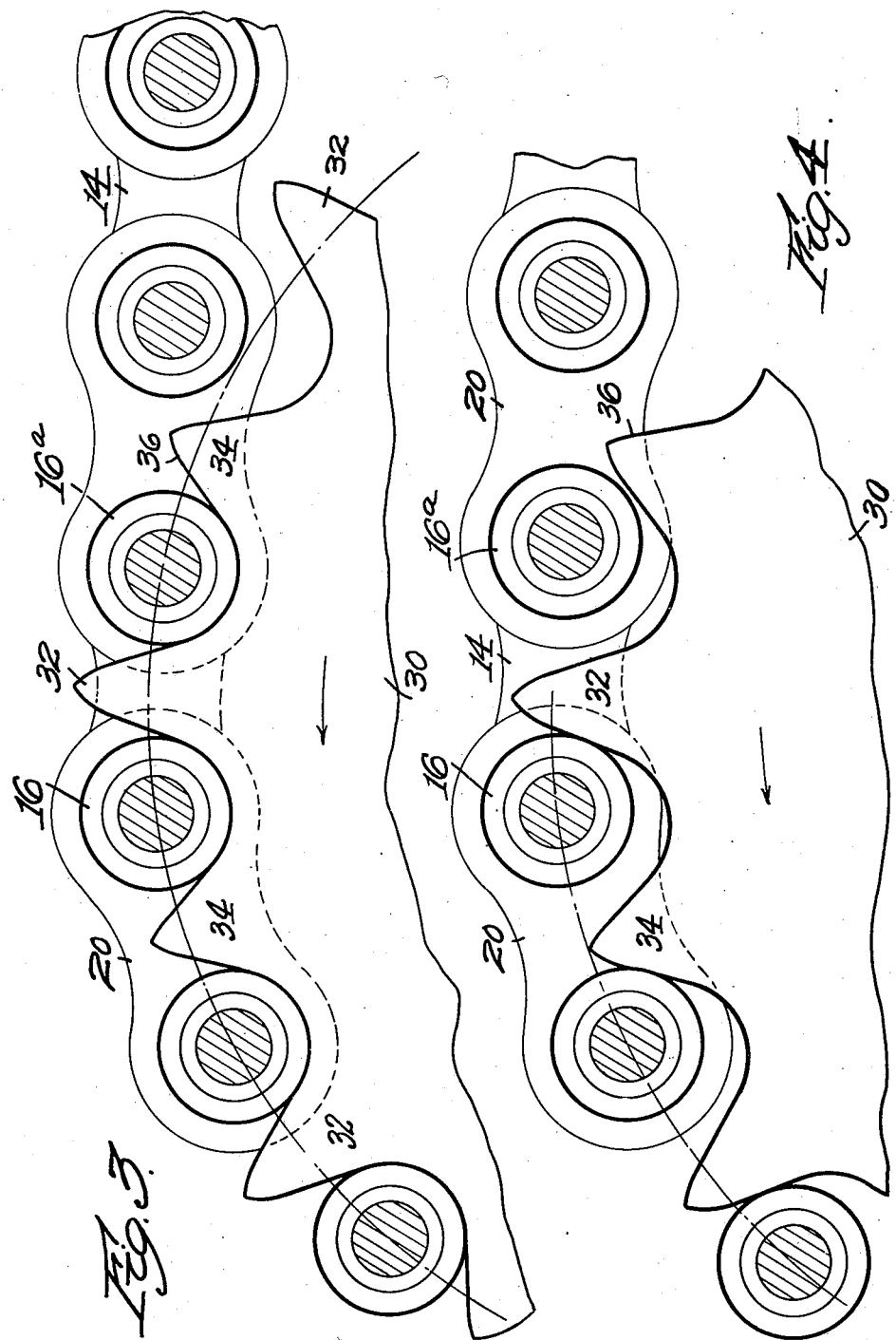
Inventor
Hermann Klaucke
Chas. R. Fay Oct. 21, 1941. H. KLAUCKE 2,259,937
ROLLER CHAIN SPROCKET WHEEL
Filed Feb. 5, 1940 4 Sheets-Sheet 3

Inventor
Hermann Klaucke
by attorney
Chas. R. Fay

Oct. 21, 1941.   H. KLAUCKE   2,259,937
ROLLER CHAIN SPROCKET WHEEL
Filed Feb. 5, 1940   4 Sheets-Sheet 4

Inventor
Hermann Klaucke
by attorney
Chas R. Fay

Patented Oct. 21, 1941

2,259,937

UNITED STATES PATENT OFFICE 2,259,937

ROLLER CHAIN SPROCKET WHEEL

Hermann Klaucke, Worcester, Mass., assignor to Chain Belt Company, Milwaukee, Wis., a corporation of Wisconsin Application February 5, 1940, Serial No. 317,306

9 Claims. (Cl. 74—243)

The present invention relates to sprocket wheels for use with roller chains, and particularly to sprocket wheels for the straight side bar type of roller chain.

It is well known to those who are familiar with the art to which this invention pertains, that as a roller chain wears, certain of the links thereof will, in effect, become elongated; and this causes the chain as a whole to fail to operate on a true pitch circle of the sprocket, thus causing some of the rollers to take more than their designed share of the load, and causing other rollers to take less than their share, or even to fail to engage the sprocket teeth at all.

The principal objects of the present invention include the provision of a new and improved sprocket wheel which overcomes the difficulties above stated, and the provision of a method whereby such sprocket wheel may be made up and formulated; the provision of a sprocket wheel which will compensate for the inequalities of pitch in certain links of the chain due to wear; the provision of a sprocket wheel as above stated which will compensate for said inequalities without any changes or adjustments of the sprocket wheel and which will so compensate for said inequalities for so long as the chain is fit to use at all and, in fact, until it is worn out; and the provision of a sprocket wheel which allows the chain to move at all times about the sprocket on a true pitch circle, as distinguished from prior sprockets, until such time as the chain is completely worn out and discarded.

Other objects and advantages of the invention will appear hereinafter.

Reference is to be had to the accompanying drawings, in which

Fig. 1 is a partial front view of an 18 tooth sprocket wheel of American standard tooth profile, showing the position of the worn chain pins in relation to a true pitch circle;

Fig. 2 is a partial view similar to Fig. 1, but showing an American standard tooth sprocket having 40 teeth;

Fig. 3 is a partial front view of a sprocket embodying the present invention, the chain being new and correctly seated;

Fig. 4 is a partial view similar to Fig. 3, but showing the position of a badly worn chain in relation to its new but still true pitch circle;

Figures 5, 6:
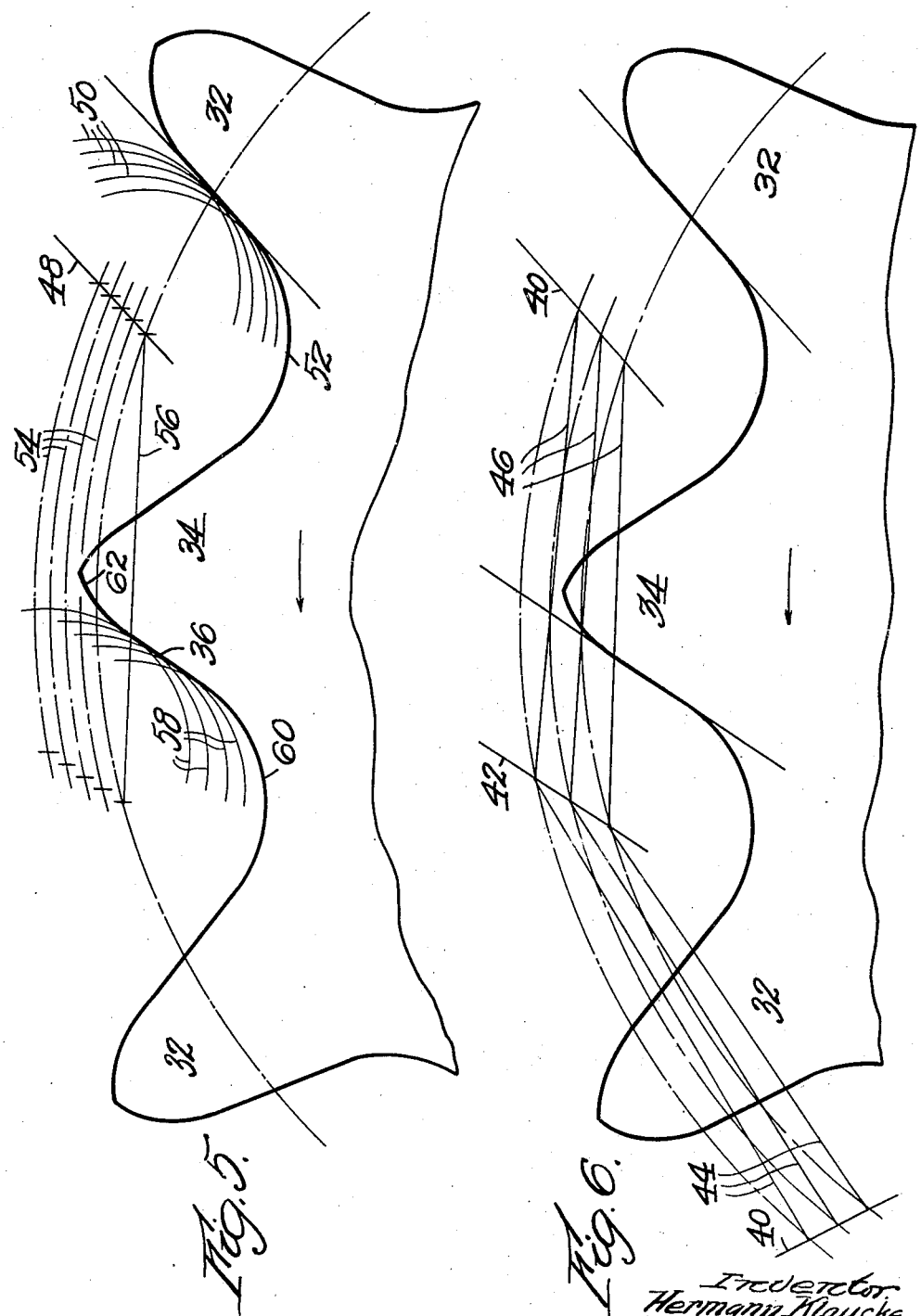
Figs. 5 and 6 are diagrammatic views showing the new and improved method of formulating the sprocket.

The present invention is applicable to all sprocket wheels for straight side bar type roller chains, and particularly to sprocket wheels of less than 45 teeth.

In the following description, the distance between two adjacent chain joints will be referred to as the chain pitch, or the pitch chord, with reference to the sprocket wheel; and that circle which passes through the centers of the chain joints, as located about the sprocket, will be referred to as the pitch circle, the diameter of this circle being called the pitch diameter.

It will be necessary to explain the prior art and its faults, in order to understand the present invention.

It is well known, of course, that wear at the joints of any chain causes the latter to elongate, and therefore an old, worn chain will have a greater pitch than it had when new. In the straight side bar roller chain, wear at the joints has the effect, not only of elongating the chain as a whole, but of elongating the pitch from roller link to roller link, while not affecting the pitch of the roller link. In other words, the roller link pitch always remains the same, but the pitch of the pin links increases with wear on the pins. As wear on the sprocket teeth does not increase the sprocket pitch, the pitches of chain and sprocket will differ after service, if they were originally the same, as is the practice.

Prior to the present invention, the known sprocket tooth forms provided for extension of the chain due to wear, but they did not provide for the inequalities in pitch between the roller links and pin links of a worn chain. This being the case, the roller chains of the prior art move in a perfect circle on the sprockets only when new, and when the chain pitch is still equal to the sprocket pitch.

The undesirable results of wear on the conventional sprocket wheel and chain is graphically illustrated in Fig. 1, wherein the 18 tooth, standard American sprocket 10 is shown as having a roller chain 12 pass therearound. Due to pin wear, the pin links 14 have become elongated in pitch, causing a lengthening between the centers of rollers 16, which are located at the ends of the pin link. Naturally this causes all the rollers to ride higher on the teeth 18, lengthening the pitch diameter. However, since wear does not have the effect of increasing the roller link pitch (the roller link being indicated at 20), the pin and roller link pitches are now unequal, and therefore the forward roller of each roller link is forced to ride even higher on the sprocket teeth 18 than the rear roller link roller, or front roller of a pin link. As shown, this causes the chain to run on no even, particular pitch circle, and this increases wear, noise, and transmission pulsations, and reduces efficiency and uniformity of chain velocity.

In Fig. 2, a 40 tooth American standard sprocket is shown at 24, and in this case the forward roller 26 of the roller link of the worn chain does not even engage its tooth and consequently carries no load. The greater the number of teeth, the worse is the variation of the pitch circle and link pitch, so that in a sprocket having medium to a large number of teeth, only every other roller engages the sprocket teeth.

The foregoing is believed to be sufficient to explain the shortcomings of the American standard sprocket wheel, which shortcomings are corrected and obviated by the present invention.

Referring now to Figs. 3 and 4, a sprocket embodying the principles of the present invention is shown at 30. This sprocket comprises long teeth 32 of approximately the American standard profile, and alternate shorter teeth 34 of a different profile. The short teeth 34 are provided with side edges 36 which extend from the points of the teeth at a greater angle from the normal than do the profile edges of the standard teeth. Also, teeth 34 are broader at the bases or roots thereof, besides being shorter than the standard teeth, although the root curves between the teeth are generally the same as in the standard sprocket, so that the rollers, when new, will seat therein in the same manner.

Referring to Fig. 4, there is here shown a worn roller chain of the straight side bar type, as in Figs. 1 and 2, but applied to a sprocket embodying the present invention. It will be noted that as the pitch of the pin links increases and the teeth and rollers wear, the chain as a whole runs on a larger pitch circle in each of Figs. 1, 2, and 4, but in the last figure, the pitch circle is still a true circle, but merely of greater diameter than the pitch circle in Fig. 3. In Figs. 1 and 2, on the other hand, not only has the pitch diameter increased, but the rollers do not run on one circle, but on two or more circles.

In the case of the new and improved sprocket, the pitch circle will increase, as a circle, until the chain is completely worn out and discarded, whereas in the prior types, the variation of the pitch circles of the separate rollers becomes more and more pronounced and the chain soon wears out and becomes useless.

The method of obtaining the exact contour of the short teeth of the present invention, is illustrated in Figs. 5 and 6, and it must be borne in mind that the teeth 34 bear a definite relation to the conventional teeth 32, and depend for their contour thereon, so that if the conventional teeth are made of a profile differing from substantially an American standard, then the teeth 34 will differ in profile from those here illustrated, while still carrying out and utilizing the invention.

Referring to Fig. 6, the lines 40 represent the path of the centers of the rear rollers 16 of the roller links 20, and the line 42 is the path of the front roller link roller 16a, drawn according to experimental and calculated movements after several degrees of use and consequent wear. The lines 44 show the pitch of the pin link, and the lines 46 show the pitch of the roller links, the latter remaining constant and the former gradually increasing with wear. Due to the pin link pitch increase, the rollers obviously do not move out in equal amounts, if the standard teeth 18 are used, as illustrated in Figs. 1 and 2, but when the tooth 34 is substituted for alternate teeth 18, all rollers are provided with equal support, and the increase in pin link pitch is compensated for, as shown in Fig. 4, so that the chain runs on a true pitch circle. Naturally, however, the roller links must straddle the short teeth, and the pin links straddle the long, or conventional teeth, since the profile angle of tooth 34 in effect recedes from the corresponding angle of its next forward tooth 32, thus allowing for the elongation of the pin link pitch.

Referring to Fig. 5, the line 48 represents the path of outward movement of the roller 16, as determined by striking off various circumferences of the roller, as by lines 50, starting with original position 52. Then the correct pitch circles are drawn as at 54, and the constant pitch chord for the roller link is laid off for each increment as at 56. Clearly, the intersections of the circle and corresponding chord locate the centers of roller 16a as it moves outwardly, and this roller is struck off for each intersection, as at 58, and the smooth curve 36 is then determined, based upon original curve 60 and generally tangent to the roller circles 58. The effective part of the tooth has been now determined, and it only remains to finish the ineffective point 62, which may be of convenient curve.

Figure 7:
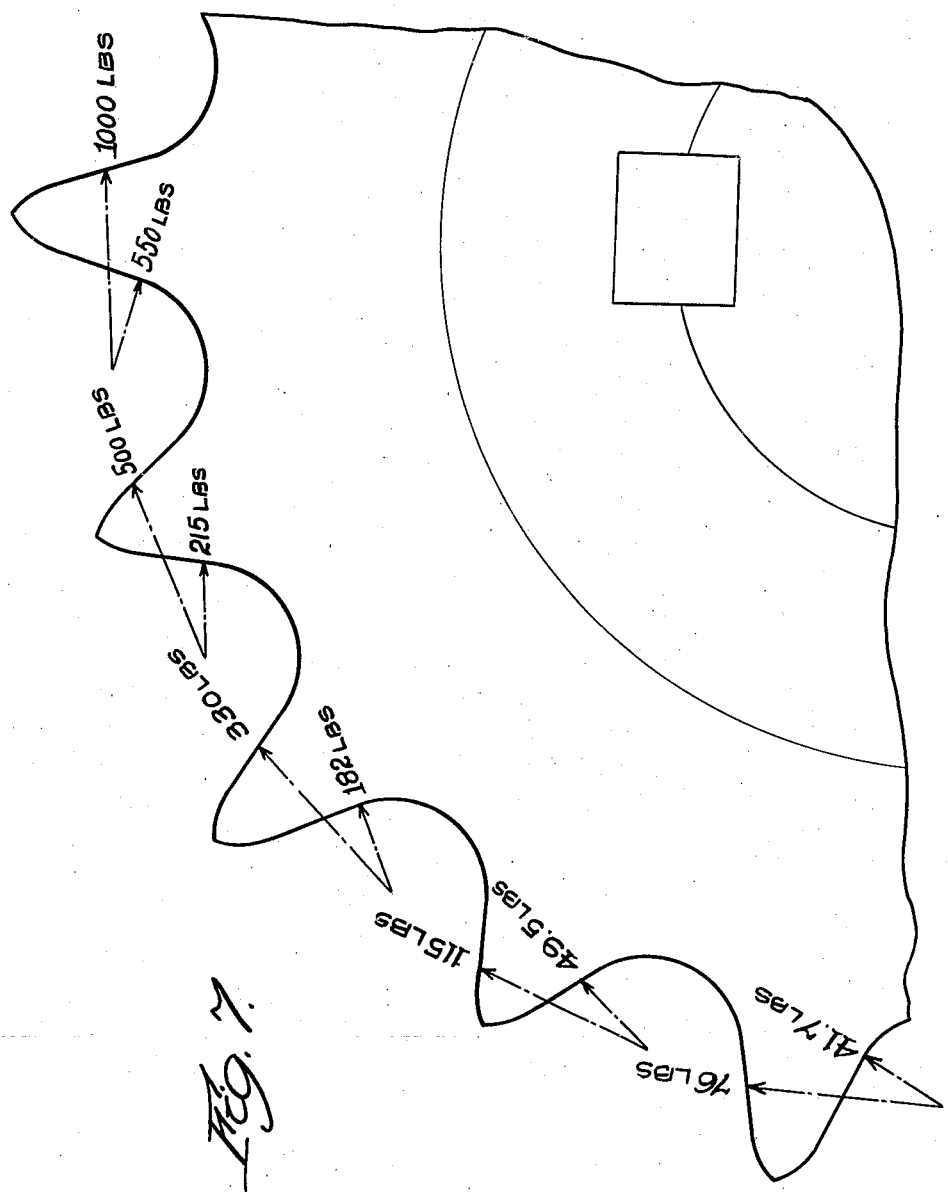
Fig. 7 is a diagrammatic view illustrating the distribution of a 1,000 pound chain pull over the teeth of an 18 tooth sprocket embodying the present invention.

Fig. 7 illustrates the actual distribution of a 1,000 pound chain pull over the teeth of an 18 tooth sprocket made according to the present invention, and the pressures on each tooth have been determined to be the same regardless of pitch. In the conventional chain, as illustrated in Figs. 1 and 2, this is not the case, but in the improved sprocket, the loading pressures, as shown, are always the same for a particular sprocket, throughout the life of the chain.

With the new sprocket, pitch chord and pin link pitch irrespective of the particular pitch diameter on which the chain operates, and extension of the chain and inequality in pitch between roller links and pin links, due to wear as above described, are taken care of automatically, with the pins moving in a perfect circle at all times. This results in greater uniformity of chain velocity and higher pitch line velocities are permissible; the load is better distributed than heretofore, and each tooth carries its designed load throughout the life of the chain, while the efficiency of the drive is increased and longer life of sprockets and chains results.

Having thus described my invention and the advantages thereof, I do not wish to be limited to the details herein disclosed, otherwise than as set forth in the claims, but what I claim is:

1. For use with a precision roller chain of the straight side bar type including roller links connected by hinge pins, and links connecting the pins, wherein wear of the chain tends to elongate the chain as a whole and to increase the pin link pitch while the roller link pitch remains constant; a sprocket wheel for said chain having teeth each adapted to be engaged by the link rollers, said teeth comprising a primary series of substantially symmetrical teeth and a secondary series of teeth alternating with the first series and having profile edges sloping at a greater angle to a normal than those of the primary teeth to compel the roller chain passing about the wheel to move on a true pitch circle regardless of wear or elongation of the chain, the primary teeth being adapted to be straddled by the pin links and the secondary teeth being adapted to be straddled by the roller links.

2. For use with a roller chain of the straight side bar type including roller links connected by hinge pins, and links connecting the pins, wherein wear of the chain tends to elongate the chain as a whole and to increase the pin link pitch while the roller link pitch remains constant; a sprocket wheel for said chain having teeth each adapted to be engaged by the link rollers in either direction of rotation of the wheel, said teeth comprising a primary series of teeth of substantially symmetrical profile and a secondary series of teeth of generally similar profile contour but having a greater slope angle and alternating with the first series, the greater slope angle being effective to compel the roller chain passing about the wheel to move on a true pitch circle regardless of wear or elongation of the chain, the primary teeth being adapted to be straddled by the pin links and the secondary teeth being adapted to be straddled by the roller links.

3. For use with a roller chain of the straight side bar type including roller links connected by hinge pins, and links connecting the pins, wherein wear of the chain tends to elongate the chain as a whole and to increase the pin link pitch while the roller link pitch remains constant; a sprocket wheel for said chain having teeth each adapted to be engaged by the link rollers in either direction of the wheel, with the pins of the roller chain passing about the wheel moving on a true pitch circle regardless of wear or elongation of the chain, said teeth being arranged in two series, one a primary series of symmetrical teeth and a secondary series of teeth alternating with the teeth of the first series and generated therefrom and with their sides sloping at a greater angle to the normal than those of the primary teeth, the primary teeth being adapted to be straddled by the pin links and the secondary teeth being adapted to be straddled by the roller links.

4. For use with a roller chain of the straight side bar type including roller links connected by hinge pins, and links connecting the pins, wherein wear of the chain tends to elongate the chain as a whole and to increase the pin pitch while the roller link pitch remains constant, a sprocket wheel for said chain having teeth each adapted to be engaged by the link rollers in either direction of rotation of the wheel, with the pins of the roller chain passing about the wheel moving on a true pitch circle regardless of wear or elongation of the chain, said teeth being arranged in two series, one a primary series of relatively long symmetrical teeth of predetermined form and a secondary series of teeth alternating with the first series and of similar profile, but of less height than the teeth of the primary series and with their sides sloping at a greater angle to the normal than those of the primary teeth, the primary teeth being adapted to be straddled by the pin links, and the secondary teeth being adapted to be straddled by the roller links.

5. The combination of a roller chain of the straight side bar type including roller links connected by hinge pins and links connecting the pins, wherein wear of the chain tends to elongate the chain as a whole and to increase the pin link pitch while the roller link pitch remains substantially constant; with a sprocket wheel for said chain having teeth each adapted to be engaged by the link rollers in driving relation, said teeth comprising a primary series of teeth of desired profile and a secondary series of teeth alternating with the first series and having profiles of greater slope to a normal than said first series, to be effective to compel the roller chain passing about the wheel to move on a true pitch circle regardless of wear or elongation of the chain, the primary teeth being straddled by the pin links and the secondary teeth being straddled by the roller links.

6. For use with a precision roller chain of the straight side bar type including roller links connected by hinge pins, and links connecting the pins, wherein wear of the chain tends to elongate the chain as a whole and to increase the pin link pitch while the roller link pitch remains constant; a sprocket wheel for said chain having teeth adapted to be engaged by the chain rollers, said teeth comprising a first series of teeth each having a roller-engaging surface located generally at a predetermined angle to a radius of said wheel, and a second series of teeth alternating with the first series, each tooth of said second series having a roller-engaging surface located at a wider angle to a wheel radius, the first series of teeth being adapted to be straddled by the pin links and the second series of teeth being adapted to be straddled by the roller links.

7. For use with a precision roller chain of the straight side bar type including roller links connected by hinge pins, and links connecting the pins, wherein wear of the chain tends to elongate the chain as a whole and to increase the pin link pitch while the roller link pitch remains constant; a sprocket wheel for said chain having teeth adapted to be engaged by the chain rollers, said teeth comprising a first series of substantially symmetrical teeth each having its roller-engaging profile edges located generally at predetermined angles to a wheel radius bisecting the tooth, and a second series of teeth alternating with the teeth of said first series, each tooth of said second series having its roller-engaging profile edges located generally at angles greater than said predetermined angles, with respect to a wheel radius bisecting the teeth of said second series, the first series of teeth being adapted to be straddled by the pin links and the second series of teeth being adapted to be straddled by the roller links.

8. In a sprocket wheel for use with a roller chain of the straight side bar type including roller links connected by hinge pins and links connecting the pins, wherein wear of the chain tends to elongate the chain as a whole and to increase the pin link pitch while the roller link pitch remains substantially constant, that improvement which comprises a first series of teeth on said wheel, each tooth having its roller-engaging profile edges located generally at predetermined angles, and a second series of teeth alternating with the teeth of said first series, each tooth of said second series having its roller-engaging profile edges located generally at wider angles than said predetermined angles, all of said teeth being adapted to be engaged by the chain rollers, the teeth of the first being adapted to be straddled by the pin links, and the teeth of the second series being adapted to be straddled by the roller links.

9. In combination with a precision roller chain of the straight side bar type including roller links connected by hinge pins, and links connecting the pins, wherein wear of the chain tends to elongate the chain as a whole and to increase the pin link pitch while the roller link pitch remains constant; a sprocket wheel for said chain having teeth adapted to be engaged by the chain rollers, said teeth comprising a first series of teeth each having a roller-engaging surface located generally at a predetermined angle to a radius of said wheel, and a second series of teeth alternating with the first series, each tooth of said second series having a roller-engaging surface located at a wider angle to a wheel radius, the first series of teeth being straddled by the pin links and the second series of teeth being straddled by the roller links.

HERMANN KLAUCKE.